UNITED STATES PATENT OFFICE.

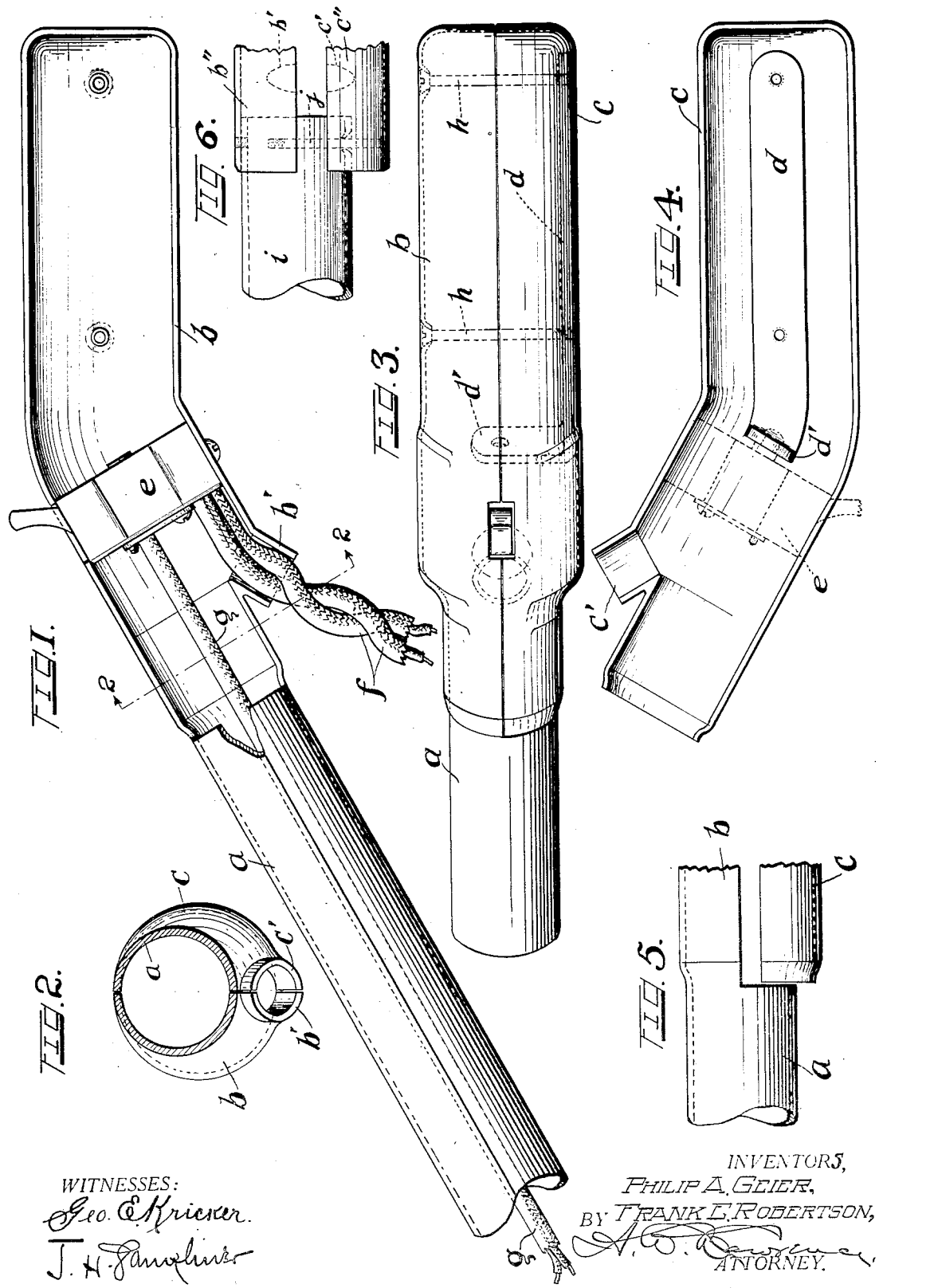

PHILIP A. GEIER AND FRANK E. ROBERTSON, OF CLEVELAND, OHIO, ASSIGNORS TO THE P. A. GEIER COMPANY, OF CLEVELAND, OHIO, A CORPORATION OF OHIO.

HANDLE MEMBER.

1,397,682.  Specification of Letters Patent.  Patented Nov. 22, 1921.

Application filed June 17, 1916. Serial No. 104,255.

*To all whom it may concern:*

Be it known that PHILIP A. GEIER and FRANK E. ROBERTSON, citizens of the United States of America, residing at Cleveland, in the county of Cuyahoga and State of Ohio, have invented certain new and useful Improvements in Handle Members, of which the following is a specification.

Our invention relates to improvements in handle members, and has for its object, the provision of a simple, strong, serviceable and cheap handle member, especially adapted for vacuum cleaning apparatus of the motor driven type. Preferably, such a handle member provides for the interior mounting of an electric switch in convenient position for operation, the introduction of conducting cords, and the ready assemblage and inspection of the parts. These results we have accomplished by providing a suitably stamped sectional handle affording a housing for the switch, and a suitable mounting therefor, together with an adjacent entering duct for the conducting cords of the power circuit.

The details of our improved structure may best be explained in connection with the accompanying sheet of drawings, wherein:—

Figure 1 is a view in side elevation of a handle member embodying our invention, with one-half of the shell removed.

Fig. 2 is a transverse section on line 2—2 of Fig. 1.

Fig. 3 is a plan view of the handle member.

Fig. 4 is a plan of the removable portion of the shell, viewed interiorly.

Fig. 5 is a fragmentary detail illustrating the members just as they are about to be separated. Fig. 6 shows a modification.

Throughout the several figures of the drawings, we have employed the same character of reference to indicate similar parts.

The handle member may be constructed from stamped, cast or tubular parts; the former being used, however, permits of integral construction. Referring to Figs. 1 and 4, which show the separated elements of the handle member; the switch being in position, it is seen that they comprise a tubular portion $a$, which may either be formed from tubing, and of the desired length, or it may be stamped from a blank of sheet metal, integral with the handle section $b$. A symmetrical handle section $c$, likewise is stamped from sheet metal, or these parts may be formed by casting in the well known manner, if desired. Interiorly secured, as by brazing, to one of said sections $c$, is a reinforcing strip $d$, having an end $d'$, bent up at right angles, to which the electric switch $e$ may be attached, as indicated by dotted lines, Fig. 4. Alternatively the switch may be secured to the opposing handle section $b$, as shown in Fig. 1, and both of said sections are provided with a diagonally extending half-duct $b'$, $c'$, respectively, through which the cord $f$, of the power circuit is adapted to be led. The secondary cord $g$, extends downwardly through the tubular member $a$, for carrying current to the motor of the vacuum cleaner, (not shown). Two assembling screws $h$, $h$, are adapted to be inserted through handle section $b$, and engage tapped openings in the reinforcing strip $d$, whereby the several elements of the handle section are firmly, yet separably assembled.

In Fig. 6 a modified handle structure is shown in a fragmentary view, whereby tubing $i$, is availed of for indefinitely extending the handle. The cast or stamped handle section $b$, is spot-welded adjacent to the upper end of the tubing $i$, with its half-collar $b''$, embracing the same. The half-collar $c''$ of section $c$, engages the opposite side of the tubing and a screw $j$ removably secures the parts together in this location.

From the foregoing, it will be understood that the construction is one which peculiarly lends itself to economical manufacture, while affording maximum strength and convenience in service. The inspection of the switch parts, and conducting cords is readily secured, merely by removing the assembling screws, and altogether the device is one that commends itself for use with portable vacuum cleaners.

Having now described the device of our invention, we claim as new, and desire to secure by Letters Patent:—

1. A handle member, comprising two hollow symmetrical metallic shells, a reinforcing strip terminally bent to form an attaching portion secured interiorly of one of said shells, and assembling screws adapted to enter tapped openings therein and removably unite the symmetrical shells, substantially as set forth.

2. A handle member, comprising two handle sections jointly forming a tubular handle as assembled, and provided with an angularly positioned integral duct, of a reinforcing piece secured interiorly of one of said sections, suitably tapped, and provided with an extension adapted to form a switch support, and assembling screws adapted to be inserted through the opposing handle section and engage the tapped part for removably securing the handle sections together, substantially as set forth.

3. A handle member, comprising a tubular portion, a half-handle section and lateral duct of hollow construction secured thereto, a symmetrical hollow half-handle section and lateral duct, removably associated therewith and engaging the tubular portion, and means for removably uniting said handle sections, substantially as set forth.

4. A handle member of the class described, comprising two substantially symmetrical sheet metal handle sections of semi-cylindrical angular shape with an angularly positioned duct extending to a switch-receiving receptacle, a reinforcing member having an angularly bent attaching terminal and tapped openings secured to one of said sections adjacent to the switch-receiving receptacle, and assembling screws adapted to enter said tapped openings and removably unite said handle sections, substantially as set forth.

5. A handle member of the class described, comprising two sheet metal handle sections of angularly bent semi-cylindrical shape with a laterally positioned duct extending to a switch-receiving receptacle; one of said sections having an integral cylindrical portion, an elongated reinforcing member having a rectangularly bent attaching terminal and tapped openings secured to one of said sections adjacent to the switch-receiving receptacle, and assembling screws adapted to enter said tapped openings and separably unite the handle sections, substantially as set forth.

6. A handle member of the class described, comprising a full tubular portion and an integral half-handle section and angular duct both extending at an angle to the tubular portion, a symmetrical half-handle section and angular duct removably associated therewith for completing the handle, and means for separably uniting the respective half-handle and duct sections, substantially as set forth.

In testimony whereof we do now affix our signatures in the presence of two witnesses.

PHILIP A. GEIER. [L. S.]
FRANK E. ROBERTSON. [L. S.]

Witnesses:
   JAMES A. FARRELL,
   ALBERT LYNN LAWRENCE.